United States Patent
Morreale

Patent Number: 6,160,331
Date of Patent: *Dec. 12, 2000

[54] APPARATUS AND METHOD FOR REDUCING NOISE AND VIBRATION IN AN ELECTRIC MOTOR

[75] Inventor: Anthony Peter Morreale, Bonsall, Calif.

[73] Assignee: BEI, Kimco Magnetics Division, San Marcos, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/211,021

[22] Filed: Dec. 14, 1998

[51] Int. Cl.[7] .................................................. H02K 5/24
[52] U.S. Cl. ........................... 310/51; 310/93; 310/90; 310/91; 310/80; 310/81; 310/51; 74/57 A
[58] Field of Search ........................ 310/51, 81, 93, 310/80, 90, 91; 74/57 A

[56] References Cited

U.S. PATENT DOCUMENTS

| | | | |
|---|---|---|---|
| 1,688,891 | 10/1928 | Spreen | 310/51 |
| 3,546,504 | 12/1970 | Janssen et al. | 310/51 |
| 4,647,803 | 3/1987 | Heide et al. | 310/51 |
| 4,819,439 | 4/1989 | Higham | 62/6 |
| 4,924,675 | 5/1990 | Higham et al. | 62/6 |
| 5,022,039 | 6/1991 | Karube et al. | 372/58 |
| 5,061,867 | 10/1991 | Seiffert et al. | 310/51 |
| 5,079,466 | 1/1992 | Jones | 310/91 |
| 5,132,584 | 7/1992 | Sasamoto et al. | 310/68 D |
| 5,235,227 | 8/1993 | Fazekas | 310/51 |
| 5,376,850 | 12/1994 | Elsing et al. | 310/67 R |
| 5,537,810 | 7/1996 | Paweletz | 57/100 |
| 5,777,405 | 7/1998 | Kurozumi et al. | 310/40 MM |
| 5,798,887 | 8/1998 | Yoshida et al. | 360/99.08 |
| 5,802,837 | 9/1998 | Paweletz et al. | 57/406 |
| 5,844,748 | 12/1998 | Dunfield et al. | 360/99.08 |

FOREIGN PATENT DOCUMENTS 1 207 145  9/1970  United Kingdom .

OTHER PUBLICATIONS

BEI Kimco Magnetics Division, San Macros, California, Drawing No. 1015–005Z, entitled "Final Assembly", used in model No. DIH15–23–001Z, drawn prior to Dec. 14, 1997.

BEI Kimco Magnetics Division, San Marcos, California, Drawing No. 1015–005Z, entitled "FINALon Aug. 8, 1996 Assembly (Motor with Urethane Bushing Front Bearing)", used in model No. DIH15–23–001Z, drawn prior to Dec. 14, 1997.

*Primary Examiner*—Nestor Ramirez
*Assistant Examiner*—Thanh Lam
*Attorney, Agent, or Firm*—Limbach & Limbach L.L.P.

[57] ABSTRACT

An apparatus and method are provided for reducing noise and vibration in an electric motor. In order to reduce the generation of vibrations and the resultant audible noise, vibration damping material is used to de-couple vibrations from the rotor and stator which would otherwise be transmitted to other parts of the motor.

26 Claims, 5 Drawing Sheets

$F_C$ = MAGNETOSTRICTIVE FORCE $F_C$ = MAGNETOSTRICTIVE FORCE $F_C$ = MAGNETOSTRICTIVE FORCE

6,160,331

APPARATUS AND METHOD FOR REDUCING NOISE AND VIBRATION IN AN ELECTRIC MOTOR

TECHNICAL FIELD

The present invention relates generally to motors and more specifically to vibration and noise damping in electric motors.

BACKGROUND OF THE INVENTION

In conventional electric motors, the components of the motor are rigid and are in direct contact. These rigid parts are typically metal. Having these rigid parts in direct contact is desirable in some respects. For example, the direct contact of metal parts facilitates heat transfer and allows the motor to cool sufficiently during operation. In addition, the direct coupling of rigid parts helps to keep moving parts in proper alignment. However, the direct contact of rigid parts also facilitates the transmission of vibrations and consequently results in significant levels of noise.

For example, in conventional brushless direct current ("DC") motor construction (FIG. 2), the bearings are fastened directly to the rotor shaft and the motor housing. The stator stack is also connected directly to the motor housing. The shaft of the rotor is typically made of steel. The bearings are also typically made of steel. The housing is typically aluminum or steel.

At rotational speed there will be some degree of residual rotor unbalance, even if a pre-balancing operation is performed prior to use. This unbalance causes vibration in the front and rear bearings. The vibration is conducted, through the metal-to-metal fit of the shaft bearing and housing, directly to the mounting surface. This vibration of the mounting surface will be transmitted to the machine that contains the motor, creating noise in the frame or other components of the machine.

Any vibration that is generated in the rotor is transmitted to the motor stator by variation in the motor air gap. This variation in air gap changes the radial forces on the stator because of the change in magnetic attraction between the stator and rotor. Stator vibration is then transmitted to the motor housing and then to the frame of the machine to which the motor is fastened.

Additional vibration in the stator is caused by magnetostriction in the stator laminations. When the motor is in operation, these laminations are constantly being stressed from round to oval as each stator pole pair is electrically energized. The magnetic stress caused by the current flowing through successive coils distorts the stack as shown in FIGS. 3A, 3B and 3C. This variation in stack stress moves the motor housing, thereby generating audible noise as in an audio speaker.

The inventor has previously used urethane bushings around the rotor bearings to dampen noise from the bearings. For example, Model No. D1H18-23-004Z sold by BEI, Kimco Magnetics Division included such urethane bushings. However, the use of urethane bushings around the rotor bearings has met with limited success in that it did not result in a significant reduction in vibration or noise.

SUMMARY OF THE INVENTION

In accordance with the present invention, to reduce the generation of vibrations and the resulting generation of audible noise, vibration damping material is used to de-couple vibrations from the rotor and stator which would otherwise be transmitted to other parts of the motor. This material may be composed of any substance which will cause a significant reduction in the transmission of vibrations, such as silicon rubber, urethane, "EAR" material, manufactured by EAR Specialty Composites of Indianapolis, Ind. or Chomerics, (the material used in the manufacture of semiconductors), manufactured by the Chomerics Division of Parker Hannifin of Woburn, Mass.

The most dramatic improvements in noise suppression have resulted from de-coupling the stator vibrations from the motor housing. This is accomplished by using a layer of vibration damping material between the stator lamination and the housing, which blocks the vibration from the stator magnetostriction and rotor pull effects from being transmitted to the motor housing.

For materials which are inefficient in heat transfer such as silicon rubber, urethane and "EAR" material, the thickness of the vibration damping material surrounding the stator is very important: it must be thin enough to fit into the space between the stator and the housing and thin enough to allow the motor to cool sufficiently during operation, yet thick enough to provide a significant degree of vibration damping.

The most significant noise reduction is achieved when vibration damping material is used to isolate numerous rigid parts which were formerly in contact or otherwise vibrationally coupled, including: (1) the stator and housing, as described above; (2) the rotor bearings and housing; (3) the housing and front flange/end bell; and (4) the rotor shaft and its magnet.

These and other features and advantages of the present invention will be more readily understood upon consideration of the following detailed description of certain preferred embodiments of the present invention and of the accompanying drawings.

DETAILED DESCRIPTION OF THE INVENTION

Figure 4A:
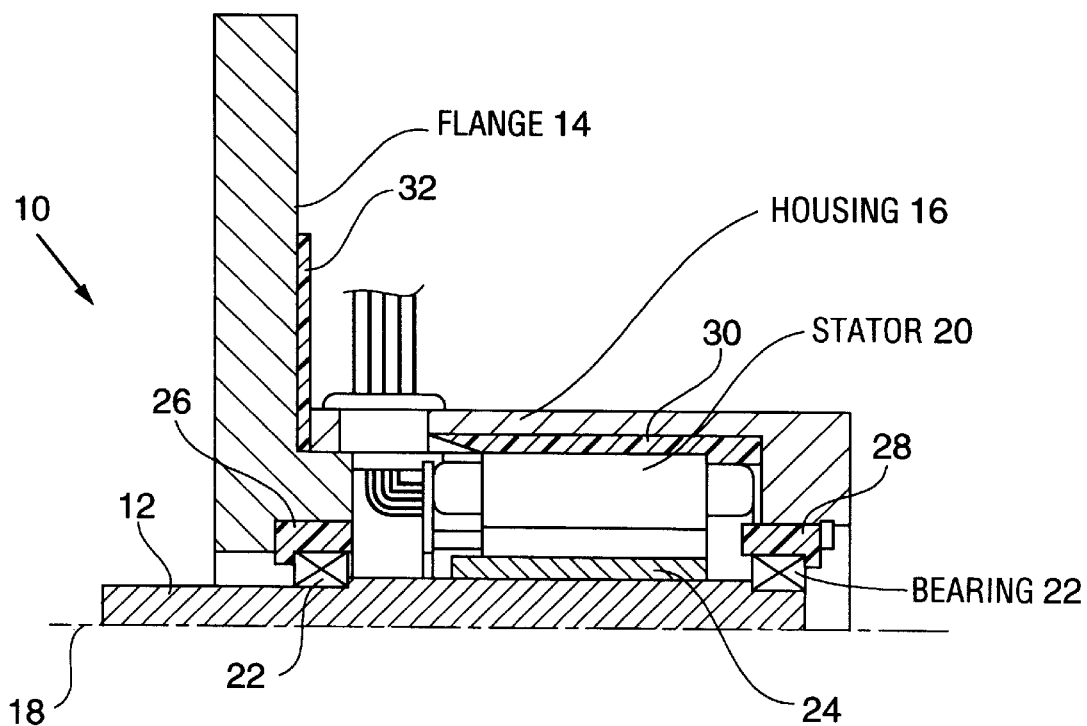
FIG. 4A is a partial cross-section of a brushless DC motor illustrating vibration damping inserts 26, 28, 30 and 32 which have been added to the rotor bearings 22, stator 20 and flange 14, in accordance with the present invention.

In the embodiment shown at FIG. 4A, vibration damping inserts 26, 28, 30 and 32 have been added to the rotor bearings 22, stator 20 and flange 14. In another embodiment, vibration damping insert 36 has been inserted between the rotor shaft 12 and the rotor magnet 24; this aspect of the invention is visible on FIG. 4B.

The inserts may be composed of any vibration damping material, such as material which has the property of converting a substantial amount of the impinging mechanical energy into heat energy. Examples of such material include silicon rubber and urethane. In this application, when vibration damping material is described as "solid," the intent is to refer to a state of matter and distinguish the solid state from the liquid and gaseous states. In this context, "solid" does not necessarily mean hard or non-porous. Vibration damping inserts composed of "EAR" material, manufactured by EAR Specialty Composites of Indianapolis, Ind., have proven to be particularly suitable for fabricating vibration damping inserts. Vibration damping inserts composed of "ZORBOTHANE" material, manufactured by Zorbothane, Incorporated of Kent, Ohio, have also proven to be useful for fabricating vibration damping inserts. Materials used in the manufacture of semiconductors, such as Chomerics, have a highly desirable combination of vibration damping and heat conduction properties which may make these materials well suited for use as vibration damping inserts.

Referring to FIG. 4A, elements 26 and 28 are vibration damping inserts which block vibrations from leaving the rotor and rotor bearings, which vibrations would otherwise enter the housing 16 or the flange 14. These elements 26 and 28 are shown positioned between the outer race of bearings 22 and the flange 14 or housing 16.

Element 30 of FIG. 4A is a stator damping insert, which is a central feature of the subject invention. Element 30 provides a layer of vibration damping material between the stator lamination 20 and the housing 16 which blocks the vibration from the stator magnetostriction and rotor pull effects from being transmitted to the motor housing 16.

When using vibration damping material which does not efficiently dissipate heat, such as urethane or EAR material, the thickness of the stator damping insert 30 is critical because it surrounds the stator 20 and has the potential of retaining an undesirable amount of heat during operation of the motor 10. Therefore, the need for heat dissipation must be balanced against the degree of noise suppression. The applicant has found that forming the stator damping insert 30 with a thickness in the range of 4 mils to 10 mils (0.004 inches to 0.010 inches) allows for sufficient heat dissipation yet provides a significant level of noise suppression.

However, other thicknesses may be used. The 4 mill to 10 mil thickness range is partly dependent on the type of material used for the stator damping insert. If the vibration damping material used also has the ability to efficiently conduct heat away from the stator, then a thicker layer can be used.

Referring again to the embodiment shown in FIG. 4A, the cross-sectional shape of the stator damping insert 30 resembles a railroad spike. However, the shape of the preferred embodiment of the entire stator damping insert 30 is similar to that of a cylinder with a tapered rim, a thicker wall in the bottom and a circular hole cut in the bottom. The tapered rim allows for the stator 20 to slide more easily into the stator damping insert 30 to permit an interference fit between the stator 20 and the housing 16.

In the preferred embodiment of stator damping insert 30, the bottom wall is thickened to form a "shoulder" against which the end of stator 20 is pressed after stator 20 is inserted into stator damping insert 30. In FIG. 4A, this shoulder is adjacent to the arrow indicating the position of stator 20.

Element 32 of FIG. 4A is a vibration damping insert known as a flange damping insert, the dimensions of which may be adjusted in accordance with the dimensions of the flange 14. The flange damping insert 32 is placed between the motor housing 16 and front flange 14 or end bell. This vibration damping insert blocks the axial vibration reaching the end bell and provides vibration damping for the flat end cap.

Figure 4B:
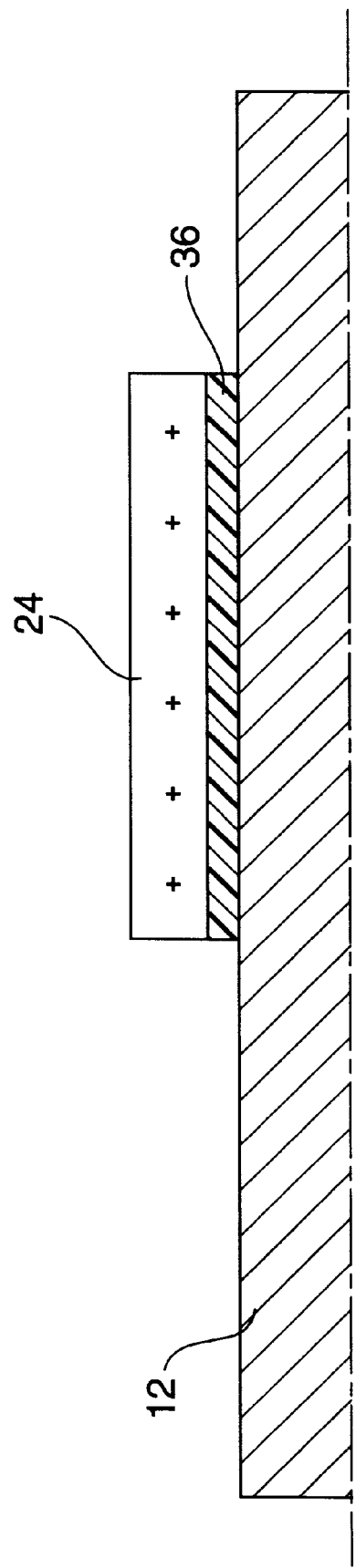
FIG. 4B illustrates vibration damping insert 36 between rotor shaft 12 and rotor magnet 24, in accordance with the present invention.

Another useful vibration damping insert 36 of the preferred embodiment, disposed between the rotor shaft 12 and the rotor magnet 24, is shown in FIG. 4B. This vibration damping insert 36 is typically attached to the shaft 12 by an interference fit or with epoxy. When epoxy is used, the magnet 24 slides on to the shaft 12 and epoxy and vibration damping material 36 are squeezed in between the magnet 24 and the shaft 12.

As a part of the best mode of practicing the invention, the factors which cause noise in the motor should be reduced to a minimum: 1) the rotor balance should be improved, if possible; 2) the air gap distance should be held constant; 3) the windings should be impregnated; and 4) the best bearings and grease lubricants available should be used.

After these vibration sources are minimized, the next step is to block the transmission of the vibration through various rigid barrier transitions using the following method:

A) The bearings should be supported on vibration damping materials 26 and 28, blocking the vibration from leaving the rotor/bearings and entering the housing (FIG. 4A);

B) The stator should be supported on a layer of vibration damping material 30 between the lamination 20 and the housing 16, blocking the vibration from the stator magnetostriction and rotor pull effects from being transmitted to the motor housing (FIG. 4A);

C) Vibration damping material 32 should be placed between the motor housing and front flange/end bell. This blocks the axial vibration from reaching the end bell and damps the tendency of the flat end cap to ring (FIG. 4A); and D) Vibration damping insert 36 should be placed between rotor shaft 12 and rotor magnet 24.

Figure 1:
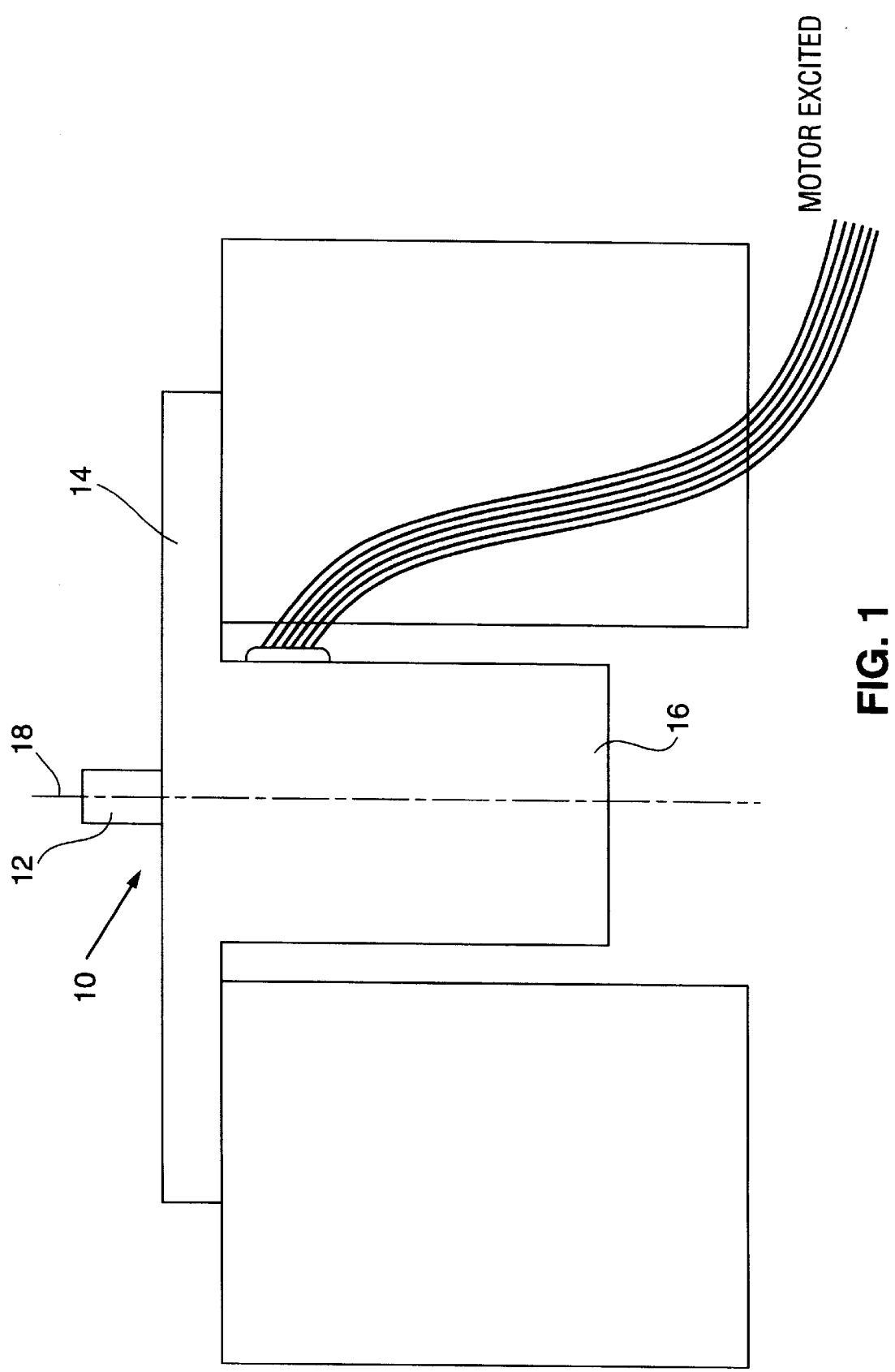
FIG. 1 illustrates a conventional brushless DC motor 10 mounted to a frame.
Figure 2:
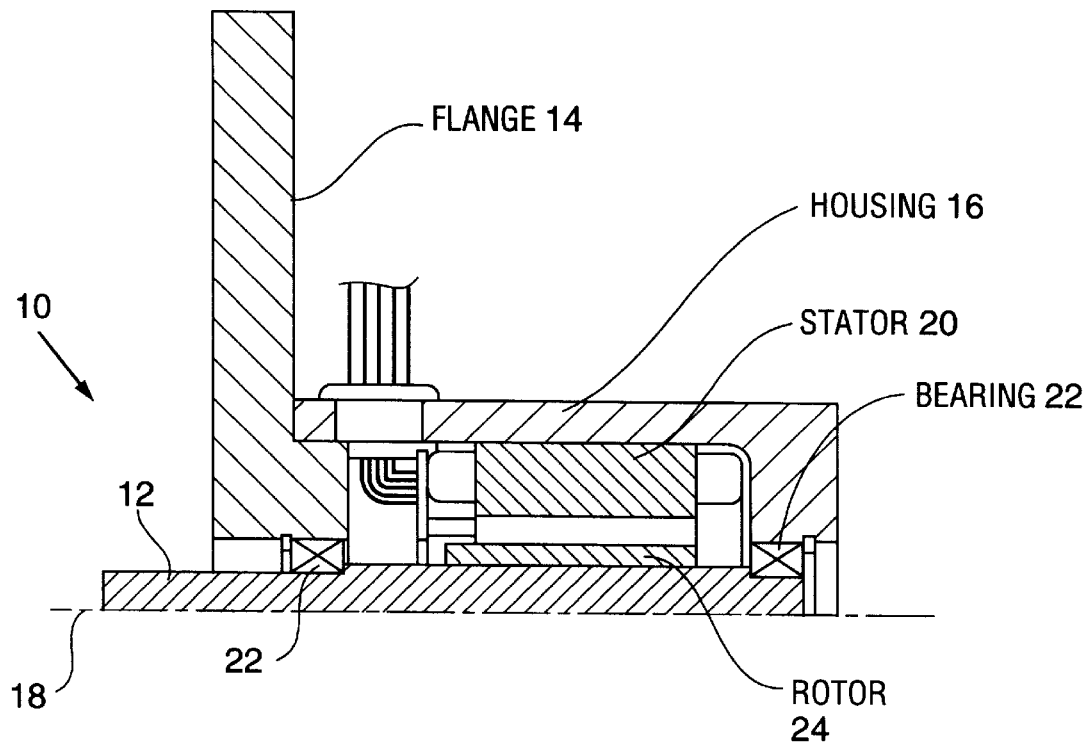
FIG. 2 is a partial cross-section of conventional brushless DC motor 10 of FIG. 1, taken from the center line 18 of the shaft 12, radially to the mounting frame 14 of the motor 10.
Figure 3A:
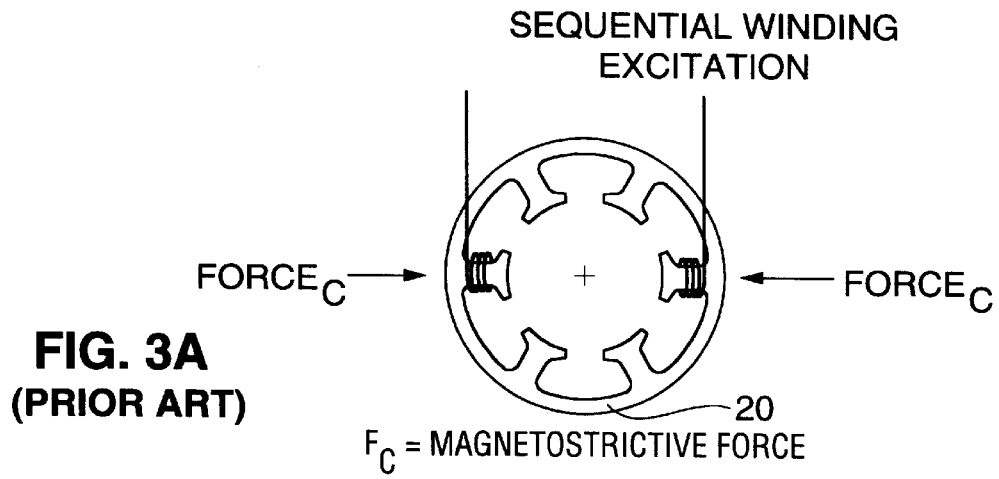
FIG. 3 is a radial cross-section of the stator 20 partially depicted in FIG. 2, which illustrates the magnetostrictive force caused by the sequential excitation of opposing stator windings.
Figure 3B:
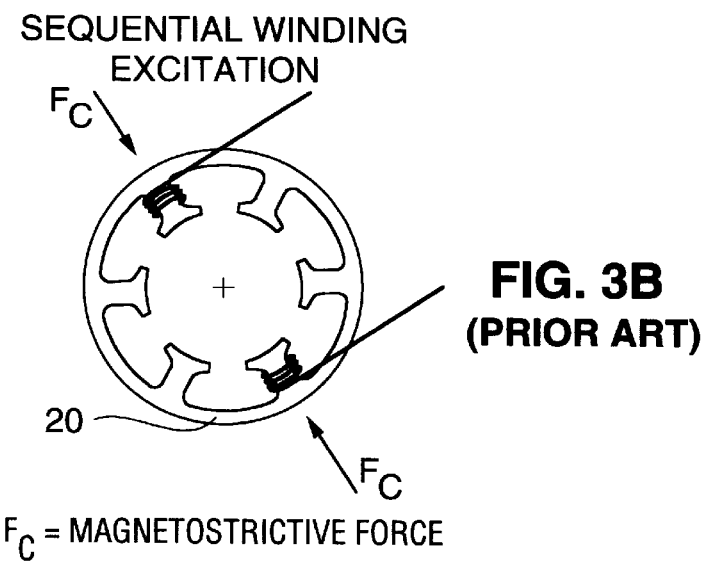
Figure 3C:
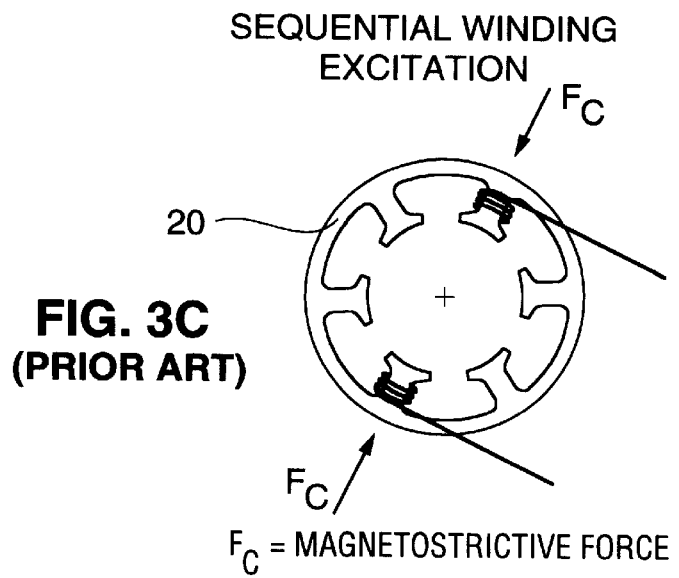

Motors constructed by conventional methods (FIGS. 1 and 2) had noise levels, when tested by a dB meter placed 6 inches from the motor shaft 12, of 60–70 dB in an ambient noise environment of 40 dB. The same motor stator and rotor, when assembled in accordance with steps A, B, and C, above (FIG. 4A), had motor noise levels of 48–50 dB in an ambient noise environment of 40 dB.

The noise level of a conventional motor, over ambient, was 20–30 dB. The noise level of the embodiment of the present invention shown at FIG. 4A was 8–10 dB over ambient, a ratio of about 3:1. The absolute improvement of 12–20 dB represents a reduction of noise energy to between $\frac{1}{16}$ and $\frac{1}{64}$ of the conventional design. The machine noise reduction because of this change is equally significant: the resulting noise level was from $\frac{1}{16}$ to $\frac{1}{64}$ of the original noise level.

While the foregoing is a complete description of the preferred embodiment of the invention, various alternatives and modifications may be used. Therefore, the preferred embodiments should not be interpreted to limit the scope of the present invention, which is defined by the following claims.

What is claimed is:

1. An electric motor, comprising:

a housing;

a flange attached to the housing;

a rotor including a rotor shaft and a magnet, the rotor shaft being supported for rotation at a first end with respect to the housing and at a second end with respect to the flange;

a stator disposed between the housing and the rotor, the stator having a length and a circumference; and a stator damping insert disposed between the housing and the stator, extending substantially the length of the stator and encompassing substantially the entire circumference of the stator, wherein the stator damping insert has an inner surface and an outer surface, and wherein the outer surface has a substantially constant radius.

2. The electric motor of claim 1, further comprising:

a first bearing disposed between the rotor shaft and the housing; and at least one solid bearing damping insert disposed between the first bearing and the housing.

3. The electric motor of claim 1, further comprising:

a second bearing disposed between the rotor shaft and the flange; and at least one solid bearing damping insert disposed between the second bearing and the flange.

4. The electric motor of claim 1, further comprising at least one flange damping insert disposed between the flange and the housing.

5. The electric motor of claim 1, wherein the stator damping insert is formed in the shape of a cylinder with an open top end, and bottom end and side walls and wherein the side walls have a side wall thickness which decreases in the direction of the open top end.

6. The electric motor of claim 5, wherein the bottom end of the stator damping insert is formed in the shape of a shoulder against which an end of the stator may be fitted.

7. The electric motor of claim 6, wherein there is an interference fit between the housing, the stator and the stator damping insert.

8. The electric motor of claim 5, wherein there is an interference fit between the housing, the stator and the stator damping insert.

9. The electric motor of claim 1, wherein the stator damping insert is composed of a material selected from the group consisting of silicon rubber, urethane and E-A-R material.

10. An electric motor, comprising:

a housing;

a flange attached to the housing;

a rotor including a rotor shaft and a magnet, the rotor shaft being supported for rotation at a first end with respect to the housing and at a second end with respect to the flange;

a stator disposed between the housing and the rotor, the stator having a length and a circumference;

a stator damping insert disposed between the housing and the stator, extending substantially the length of the stator and encompassing substantially the entire circumference of the stator; and at least one vibration damping insert disposed between, and in contact with, both the rotor shaft and the magnet.

11. An electric motor, comprising:

a housing;

a flange attached to the housing;

a rotor including a rotor shaft and a magnet, the rotor shaft being supported for rotation at a first end with respect to the housing and at a second end with respect to the flange;

a first bearing disposed between the rotor shaft and the housing;

a second bearing disposed between the rotor shaft and the flange;

a stator disposed between the housing and the rotor, the stator having a length and a circumference;

at least one bearing damping insert disposed between the first bearing and the housing;

at least one bearing damping insert disposed between the second bearing and the flange;

at least one flange damping insert disposed between the flange and the housing;

a stator damping insert disposed between the housing and the stator, extending substantially the length of the stator and encompassing substantially the entire circumference of the stator;

at least one vibration damping insert disposed between, and in contact with, both the rotor shaft and the magnet.

12. An electric motor, comprising:

a housing;

a flange attached to the housing;

a rotor including a rotor shaft and a magnet, the rotor shaft being supported for rotation at a first end with respect to the housing and at a second end with respect to the flange;

a stator disposed between the housing and the rotor; and stator damping means for de-coupling vibrations from the stator which would otherwise be transmitted from the stator to the housing, wherein the stator damping means extends substantially the length of the stator, encompasses substantially the entire circumference of the stator and has an outer surface with a substantially constant radius.

13. The electric motor of claim 12, further comprising:

a second bearing disposed between the rotor shaft and the flange; and means for de-coupling vibrations from the second bearing which would otherwise be transmitted to the flange.

14. The electric motor of claim 12, further comprising means for de-coupling the vibrations of the flange from the vibrations of the housing.

15. The electric motor of claim 12, wherein the means for de-coupling vibrations from the stator which would otherwise be transmitted from the stator to the housing is also means for preventing rotation of the stator.

16. An electric motor, comprising:

a housing;

a flange attached to the housing;

a rotor including a rotor shaft and a magnet, the motor shaft being supported for rotation at a first end with respect to the housing and at a second end with respect to the flange;

a stator disposed between the housing and the rotor; and means for de-coupling vibrations from the stator which would otherwise be transmitted from the stator to the housing;

a first bearing disposed between the rotor shaft and the housing; and means for de-coupling vibrations from the first bearing which would otherwise be transmitted to the housing.

17. An electric motor, comprising:

a housing;

a flange attached to the housing;

a rotor including a rotor shaft and a magnet, the rotor shaft being supported for rotation at a first end with respect to the housing and at a second end with respect to the flange;

a stator disposed between the housing and the rotor; and means for de-coupling vibrations from the stator which would otherwise be transmitted from the stator to the housing; and means for de-coupling the vibrations of the rotor shaft from the vibrations of the magnet.

18. An electric motor, comprising:

a housing;

a flange attached to the housing;

a rotor including a rotor shaft and a magnet, the rotor shaft being supported for rotation at a first end with respect to the housing and at a second end with respect to the flange;

a first bearing disposed between the rotor shaft and the housing;

a second bearing disposed between the rotor shaft and the flange;

a stator disposed between the housing and the rotor;

means for de-coupling vibrations from the stator which would otherwise be transmitted from the stator to the housing;

means for de-coupling vibrations from the first bearing which would otherwise be transmitted to the housing;

means for de-coupling vibrations from the second bearing which would otherwise be transmitted to the flange;

means for de-coupling the vibrations of the flange from the variations of the housing; and means for de-coupling the vibrations of the rotor shaft from the vibrations of the magnet.

19. A method of reducing the noise emitted by an electric motor, said motor comprising a housing; a flange attached to the housing; a rotor including a rotor shaft and a magnet, the rotor shaft being supported at a first end with respect to the housing and at a second end with respect to the flange; a first bearing disposed between the rotor shaft and the housing; a second bearing disposed between the rotor shaft and the flange; and a stator disposed between the housing and the rotor, the stator having a length and a circumference, wherein the method comprises the step of positioning at least one stator damping insert having an outer surface with a substantially constant radius between the housing and the stator, such that the stator damping insert extends substantially the length of the stator and encompasses substantially the entire circumference of the stator.

20. The method of claim 19, further comprising the step of positioning at least one solid bearing damping insert between the first set of bearings and the housing.

21. The method of claim 19, further comprising the step of positioning at least one solid bearing damping insert between the second set of bearings and the flange.

22. The method of claim 19, further comprising the step of positioning at least one flange damping insert between the flange and the housing.

23. The method of claim 19, wherein the step of positioning comprises positioning the stator damping insert such that there is an interference fit between the housing, the stator and the stator damping insert.

24. A method of reducing the noise emitted by an electric motor, said motor comprising a housing; a flange attached to the housing; a rotor including a rotor shaft and a magnet, the rotor shaft being supported for rotation at a first end with respect to the housing and at a second end with respect to the flange; a first bearing disposed between the rotor shaft and the housing; a second bearing disposed between the rotor shaft and the flange; and a stator disposed between the housing and the rotor, the stator having a length and a circumference, wherein the method comprises the steps of:

positioning at least one stator damping insert between the housing and the stator such that the stator damping insert extends substantially the length of the stator and encompasses substantially the entire circumference of the stator; and positioning at least one vibration damping insert between, and in contact with, both the rotor shaft and the magnet.

25. An electric motor, comprising:

a support structure including a housing;

a stator supported by the support structure, the stator having a length;

a rotor which rotates with respect to the stator; and a stator damping insert disposed between the support structure and the stator, wherein the stator damping insert has an outer surface with a substantially constant radius, extends substantially the length of the stator and substantially occupies the space between the stator and the portion of the support structure which supports the stator.

26. The electric motor of claim 25, wherein there is an interference fit between the support structure, the stator and the stator damping insert.

* * * * *